United States Patent [19]

Chattha

[11] 4,209,595
[45] Jun. 24, 1980

[54] COATING COMPOSITIONS INCLUDING HYDROXY FUNCTIONAL ACRYLIC ORGANOPHOSPHATE REACTIVE CATALYST

[75] Inventor: Mohinder S. Chattha, Livonia, Mich.

[73] Assignee: Ford Motor Company, Dearborn, Mich.

[21] Appl. No.: 973,325

[22] Filed: Dec. 26, 1978

[51] Int. Cl.² .................... C08L 63/00; C08L 61/00
[52] U.S. Cl. ............................. 525/161; 260/42.22; 260/42.28; 525/158; 525/161; 525/913
[58] Field of Search ............... 260/834, 851, 854, 856; 525/158, 161, 162

[56] References Cited

U.S. PATENT DOCUMENTS

| | | | |
|---|---|---|---|
| 3,201,374 | 8/1965 | Simms | 260/854 |
| 3,532,655 | 10/1970 | Radlove | 260/854 |
| 3,773,710 | 11/1973 | Victorius | 260/856 |
| 3,790,513 | 2/1974 | Victorius | 260/856 |
| 3,846,368 | 11/1974 | Pettit | 260/856 |
| 3,865,904 | 2/1975 | Wingler | 260/856 |
| 3,959,554 | 5/1976 | Hick | 260/856 |
| 4,002,699 | 1/1977 | Labana | 260/854 |

*Primary Examiner*—Paul Lieberman
*Attorney, Agent, or Firm*—Roger L. May; Olin B. Johnson; Keith L. Zerschling

[57] ABSTRACT

An improved thermosetting coating composition of the type comprising a film forming component and an amino compound, wherein the composition cures by reaction between the amino compound and hydroxy functionality present on the film forming material. The improvement comprises including in the composition a hydroxy functional acrylic organophosphate reactive catalyst.

10 Claims, No Drawings

COATING COMPOSITIONS INCLUDING HYDROXY FUNCTIONAL ACRYLIC ORGANOPHOSPHATE REACTIVE CATALYST

BACKGROUND OF THE INVENTION

This invention relates to coating compositions of the type comprising a film forming component and an amino compound, wherein the composition cures by reaction between the amino compound and hydroxy functionality present on the film forming material. More particularly, the invention relates to thermosetting coating compositions of the aforementioned type wherein the composition includes a catalyst for the hydroxy/amino curing reaction comprising at least one hydroxy functional acrylic organophosphate reactive catalyst.

Thermosetting coating compositions which cure by reaction of hydroxy functionality with an amino compound are well known in the art. It is also well recognized in the art that it is desirable to catalyze the hydroxy/amino crosslinking reaction in order to attain a quicker and more complete cure of the coating composition. To this end, catalysts for this reaction have been developed and are also well known.

SUMMARY OF THE INVENTION

It has been discovered that thermosetting coating compositions of the aforementioned type wherein the cross-linking reaction consists essentially of a reaction between hydroxy functionality and an amino compound are significantly improved when catalyzed by a hydroxy functional acrylic organophosphate reactive catalyst consisting essentially of the reaction product of (1) a hydroxy functional acrylic copolymer which (a) has a number average molecular weight (Mn) of between about 1500 and about 6000, (b) has a glass transition temperature of between about $-25°$ C. and about $70°$ C., and (c) bears between about 2 and about 10 pendent hydroxyl groups per molecule; and (2) sufficient phosphorus pentoxide to produce a reaction product having an acid equivalent weight of between about 500 and about 3000.

In particular, it has been found that compositions catalyzed by such hydroxy functional acrylic organophosphate reactive catalysts exhibit rapid cure at low temperature and produce coatings with superior properties. In addition, the hydroxy functional acrylic organophosphate reactive catalyst does not become involved in deleterious side reactions as is the case with many conventional catalysts and has the further advantage of not leaching out of the coating composition after curing is completed.

More specifically, the catalyzed coating compositions of the invention include the broad class of thermosetting compositions wherein hydroxy functionality of the film forming component, which hydroxy functionality is either initially present, generated in situ, or both initially present, and generated in situ, is crosslinked with conventional amino functional crosslinking agents. As will be more fully described hereinafter, the hydroxy functionality which may be generated in situ may be generated in any manner known to the art with respect to this type of composition or it may be generated by a reaction between the reactive catalyst itself and functionality in the film forming material, in particular, between the catalyst and epoxy functionality in the film forming material. In this case, the reactive catalyst serves as a reactant which helps generate the hydroxy functionality subsequently engaged in the crosslinking reaction with the amino compound.

The invention will be more fully understood from the following detailed description of the invention and the examples.

DETAILED DESCRIPTION OF THE INVENTION

As discussed generally above, the coating compositions of the invention are thermosetting materials comprising a film forming material bearing hydroxy functionality which is formed by in situ reaction, an amino compound crosslinking agent, and the improved reactive catalyst of the invention. Each of the components of the coating compositions within the scope of the invention are described hereinafter in greater detail.

Hydroxy Functional Acrylic Organophosphate Reactive Catalyst

As mentioned above, the improvement in the invention resides in the use of a hydroxy functional acrylic organophosphate reactive catalyst consisting essentially of the reaction product of:

(1) a hydroxy functional acrylic copolymer which (a) has a number average molecular weight (Mn) of between about 1500 and about 6000, (b) has a glass transition temperature of between about $-25°$ C. and about $70°$ C., preferably between about $-10°$ C. and about $50°$ C., and (c) bears between about 2 and about 10 pendent hydroxyl groups per molecule; and (2) sufficient phosphorus pentoxide to produce a reaction product having an acid equivalent weight of between about 500 and about 3000, preferably between about 700 and about 1500.

The reaction between the hydroxy bearing acrylic copolymer and the phosphorus pentoxide is generally carried out by adding phosphorus pentoxide portionwise to the hydroxyl bearing acrylic copolymer, preferably an excess of the copolymer, in a liquid state or in solution in a suitable solvent. Suitable solvents include, but are not limited to, butyl acetate, mmethyl ethyl ketone, methyl amyl ketone, toluene, xylene, etc.

The hydroxy bearing acrylic copolymers used in preparing the hydroxy functional acrylic organophosphate reactive catalyst, as noted above, have a number average molecular weight of between about 1500 and about 6000 and a glass transition temperature of between about $-25°$ C. and about $70°$ C., preferably between about $-10°$ C. and about $50°$ C. These hydroxy functional copolymers are prepared by copolymerizing various monoethylenically unsaturated monomers, including at least about fifty (50) weight percent of alpha-beta olefinically unsaturated acrylate monomers. Preferred acrylate monomers are esters of $C_1$–$C_{12}$ monohydric alcohols and acrylic or methacrylic acids, e.g., methylmethacrylate, ethylacrylate, butylacrylate, butylmethacrylate, hexylacrylate, 2-ethylhexylacrylate, laurylmethacrylate, etc.

Hydroxy functional ethylenically unsaturated monomers are included in the reaction mixture of monomers used in preparing the copolymer in sufficient amounts that the copolymer molecules formed bear between about 2 and about 10 hydroxyl groups. The long list of hydroxy functional monomers which may be employed in these hydroxy functional copolymers includes, but is not limited to, the following esters of acrylic or methacrylic acid and aliphatic alcohols: 2-hydroxyethyl acrylate; 3-chloro-2-hydroxypropyl acrylate; 2-hydroxy-1-methylethyl acrylate; 2-hydroxypropyl acrylate; 3-hydroxy-propyl acrylate; 2,3 dihydroxypropyl acrylate; 2-hydroxy-butyl acrylate; 4-hydroxybutyl acrylate; diethyleneglycol acrylate; 5-hydroxypentyl acrylate; 6-hydroxyhexyl acrylate; triethyleneglycol acrylate; 7-hydroxyheptyl acrylate; 2-hydroxymethyl methacrylate; 3-chloro-2-hydroxypropyl methacrylate; 2-hydroxy-1-methylethyl methacrylate; 2-hydroxypropyl methacrylate; 3-hydroxypropyl methacrylate; 2-hydroxypropyl methacrylate; 2,3 dihydroxypropyl methacrylate; 22-hydroxybutyl methacrylate; 4-hydroxybutyl methacrylate; 3,4 dihydroxybutyl methacrylate; 5-hydroxypentyl pmethacrylate; 6-hydroxyhexyl methacrylate; 1,3-dimethyl-3-hydroxybutyl methacrylate; 5,6 dihydroxyhexyl methacrylate; and 7-hydroxyheptyl methacrylate.

Although one of ordinary skill in the art will recognize that many different hydroxy bearing monomers including those listed above could be employed, the preferred hydroxy functional monomers for use in the hydroxy functional copolymer used to prepare the hydroxy functional acrylic organophosphate reactive catalysts are $C_5$–$C_7$ hydroxy alkyl methacrylates, i.e., esters of $C_2$–$C_3$ dihydric alcohols and acrylic or methacrylic acids.

Other monoethylenically unsaturated monomers which may be used in preparing these copolymers are monovinyl hydrocarbons and certain modifying monomers. These monomers may comprise the remainder of the monomers making up the copolymer, other than said acrylate monomers and said hydroxy functional monomers; provided, however, that the modifying monomers should constitute only up to about 10 weight percent of the monomers in the copolymer. Exemplary of suitable monovinyl hydrocarbons are those containing 8 to 12 carbon atoms, such as styrene, alpha-methylstyrene, vinyl toluene, t-butylstyrene and chlorostyrene. Modifying monomers may include vinylchloride, acrylonitrile, methacrylonitrile and vinylacetate.

In preparing the hydroxy functional acrylic copolymer, the various monomers may be mixed and reacted by conventional free radical initiated polymerization in such proportional as to obtain the copolymer desired. A large number of free radical initiators are known to the art and are suitable for the purpose. These include: benzoyl peroxide; acetylcyclohexyl sulfonyl peroxide; diisobutyryl peroxide; di-(2-ethylhexylperxypivalate; decanoyl peroxide; azobis(2-methylpropionitrile), etc. The polymerization is preferably carried out in solution using a solvent in which the hydroxy functional copolymer is soluble. Included among the suitable solvents are toluene, xylene, dioxane, butanone, etc. If the hydroxy functional copclymer is prepared in solution, the solid copolymer can be precipitated by pouring the solution at a slow rate into a nonsolvent for the copolymer, such as hexane, octane, or water under suitable agitation conditions. The copolymers can also be prepared by emulsion polymerization suspension polymerization, bulk polymerization, or combinations thereof, or still other suitable methods. In these methods of preparing copolymers, chain transfer agents may be required to control the molecular weight.

A preferred temperature for carrying out the reaction between the aforementioned hydroxy functional acrylic copolymer and the phosphorus pentoxide is between about 50° C. and about 60° C. Due to the multiple hydroxy functionality of the hydroxy functional acrylic copolymer, various polymeric acid phosphates and cyclophosphates are probably generated during the synthesis. All of these organophosphate derivatives so produced serve as a reactive catalysts and, therefore, the entire reaction product mixture may be employed as the reactive catalyst. In those cases where an excess of the hydroxy functional acrylic copolymer is employed, that excess may serve as all or part of the optional hydroxy functional additive of the composition, as hereinafter described.

The hydroxy functional acrylic organophosphate reactive catalyst of the thermosetting coating compositions of the invention allows the compositions to cure rapidly at a low temperature. In all cases, the hydroxy functionality present on the hydroxy functional acrylic organophosphate reactive catalyst engages in the crosslinking reaction by reacting with the amino compound in addition to catalyzing the reaction between the amino compound and the hydroxy functionality present in the film forming materials. It is this reaction of the hydroxy functionality of the hydroxy functional acrylic organophosphate reactive catalyst which probably accounts for the fact that the catalyst does not leach out of the finally cured composition. Thus, the catalyst serves not only to catalyze the reaction between the film forming material and the crosslinking agent, but also to more completely tie up the matrix of the composition and provide a more completely integrated crosslinked composition. In those embodiments of the invention wherein the film forming material also includes an epoxy material, either on the same compound as the hydroxy functionality or on a separate compound forming a part of the film forming material, the hydroxy functional acrylic organophosphate reactive catalyst catalyst of the invention serves as a reactive catalyst in another sense. In this case, the acid functionality of the organophosphate ester(s) present in the catalyst reacts with the epoxy functionality of the film forming material to form an ester and a hydroxyl group. This hydroxyl group, as well as the organic hydroxyl groups on the hydroxy functional acrylic organophosphate reactive catalyst and the other hydroxy functionality which may be present in the film forming material is available for crosslinking with the amino crosslinking agent.

The amount of the hydroxy functional acrylic organophosphate reactive catalyst included in the compositions of the invention will vary depending upon the nature of the film forming material employed and is a matter of choice which will be made by one skilled in the art.

Film Forming Material

As discussed above, film forming materials which either include hydroxy functionality initially, generate hydroxy functionality as a result of in situ reactions during the coating process or both include hydroxy functionality initially and generate it in situ, are well known to those skilled in the art. Selection of those materials will be a matter of choice and it will be recognized that the hydroxy functional acrylic organophosphate reactive catalyst is equally applicable to all such hydroxy bearing film forming materials crosslinked with amino compound.

While it is intended that all such hydroxy bearing film forming materials be included within the scope of the invention, several of these materials will be discussed below in greater detail for purposes of exemplification.

As discussed above, the film forming material may consist essentially of a compound which bears hydroxy functionality prior to initiation of the curing reaction. In most coating compositions, such materials should have a number average molecular weight ($\overline{M}_n$) of at least 150. A preferred type of hydroxy functional material which meets these limitations consists essentially of a copolymer bearing pendent hydroxy functionality. One class of such materials has a number average molecular weight ($\overline{M}_n$) of between about 1000 and about 20,000 and a glass transition temperature (Tg) of between about $-25°$ C. and about 70° C. Such a copolymer may, for example, consist of between about 5 and about 30 weight percent of monoethylenically unsaturated monomers bearing hydroxy functionality and between about 95 and about 70 weight percent of other monoethylenically unsaturated monomers. The long list of hydroxy functional monomers which may be employed in these hydroxy functional copolymers includes, but is not limited to, the following esters of acrylic or methacrylic acid and aliphatic alcohols: 2-hydroxyethyl acrylate; 3-chloro-2-hydroxypropyl acrylate; 2-hydroxy-1-methylethyl acrylate; 2-hydroxypropyl acrylate; 3-hydroxypropyl acrylate; 2,3-dihydroxypropyl acrylate; 2-hydroxybutyl acrylate; 4-hydroxybutyl acrylate; diethyleneglycol acrylate; 5-hydroxypentyl acrylate; 6-hydroxyhexyl acrylate; triethyleneglycol acrylate; 7-hydroxyheptyl acrylate; 2-hydroxymethyl methacrylate; 3-chloro-2-hydroxypropyl methacrylate; 2-hydroxy-1-methylethyl methacrylate; 2-hydroxypropyl methacrylate; 3-hydroxypropyl methacrylate; 2,3-dihydroxypropyl methacrylate; 2-hydroxybutyl methacrylate; 4-hydroxybutyl methacrylate; 3,4-dihydroxybutyl methacrylate; 5-hydroxypentyl methacrylate; 6-hydroxyhexyl methacrylate; 1,3-dimethyl-3-hydroxybutyl methacrylate; 5,6-dihydroxyhexyl methacrylate; and 7-hydroxyheptyl methacrylate.

Although one of ordinary skill in the art will recognize that many different hydroxy bearing monomers including those listed above could be employed, the preferred hydroxy functional monomers for use in the hydroxy functional resin of the invention are $C_5-C_7$ hydroxy alkyl acrylates and/or $C_6-C_8$ hydroxy alkyl methacrylates, i.e., esters of $C_2-C_3$ dihydric alcohols and acrylic or methacrylic acids.

The remainder of the monomers forming the hydroxy functional copolymer, i.e., between about 90 and about 70 weight percent, are other monoethylenically unsaturated monomers. These monoethylenically unsaturated monomers, are preferably alpha, beta olefinically unsaturated monomers, i.e., monomers bearing olefinic unsaturation between the two carbon atoms in the alpha and beta positions with respect to the terminus of an aliphatic carbon to carbon chain.

Among the alpha-beta olefinically unsaturated monomers which may be employed in such copolymers are acrylates (meaning esters of either acrylic or methacrylic acids) as well as mixtures of acrylates and vinyl hydrocarbons. Preferably, in excess of 50 weight percent of the total of the copolymer monomers are esters of $C_1-C_{12}$ monohydric alcohols and acrylic or methacrylic acids, e.g., methylmethacrylate, 2-ethylhexylacrylate, laurylmethacrylate, etc. Among the monovinyl hydrocarbons suitable for use in forming the copolymers are those containing 8 to 12 carbon atoms and including styrene, alpha methylstyrene, vinyl toluene, t-butylstyrene and chlorostyrene. When such monovinyl hydrocarbons are employed, they should constitute less than 50 weight percent of the copolymer. Other monomers such as vinyl chloride, acrylonitrile, methacrylonitrile, and vinyl acetate may be included in the copolymer as modifying monomers. However, when employed, these modifying monomers should constitute only between about 0 and about 30 weight percent of the monomers in the copolymer.

As mentioned above, the film forming material may contain both hydroxy functionality and a material which reacts in situ to form hydroxy functionality. Exemplary of one such film forming material would be a material which consists essentially of a single copolymer bearing both hydroxy and epoxy functionality, the epoxy functionality reacting with the acid functionality of the hydroxy functional acrylic organophosphate esters of the reactive catalyst as discussed above to form hydroxy functionality which thereafter may also react with the amino crosslinking agent. Such a difunctional copolymer may be of the acrylic type similar to the hydroxy functional copolymer discussed above. A preferred bifunctional copolymer of this type has a number average molecular weight ($\overline{M}_n$) of between about 1500 and about 10,000 and a glass transition temperature (Tg) of between about $-25°$ C. and about 70° C. Such a polymer preferably is formed from between about 5 and 25 weight percent of monoethylenically unsaturated monomers bearing glycidyl functionality and between about 5 and about 25 weight percent of monoethylenically unsaturated monomers bearing hydroxy functionality, with the total of the monoethylenically unsaturated monomers bearing either said glycidyl functionality or said hydroxy functionality being not greater than 30 weight percent of the monomers in the copolymer. The remainder of the monomers in the copolymer, i.e., between about 90 and about 70 weight percent, consist of other monoethylenically unsaturated monomers, such as those described above.

Also as mentioned above, the film forming material may consist essentially of a compound which reacts in situ to form hydroxy functionality, i.e., a compound not initially including hydroxy functionality. Such a compound could be, for example, a copolymer such as those described above, but bearing only glycidyl functionality. Such a copolymer bearing pendent functionality would have a number average molecular weight ($M_n$) of between about 1500 and about 10,000 in a glass transition temperature (Tg) of between about $-25°$ C. and about 70° C. A preferred copolymer of this type consists of between about 10 and about 30 weight percent of monoethylenically unsaturated monomers bearing glycidyl functionality and between about 90 and about 70 weight percent of other monoethylenically unsaturated monomers, as discussed above.

Still another compound bearing epoxy functionality which may be employed when solely epoxy functionality, which in turn will react with the acid functionality of the organophosphate ester(s) in the reactive catalyst to form hydroxy functionality, is desired is a polyepoxide resin having a number average molecular weight of between about 140 and about 3000. Such polyepoxide resins could be selected from aliphatic, cycloaliphatic and aromatic polyepoxides falling within the stated molecular weight range. Such polyepoxides are well known compositions and any of these may be employed. Among the many suitable types of polyepoxides are those disclosed by U.S. Pat. Nos. 3,404,018; 2,528,359; 2,528,360; 3,198,850; 3,960,979; and 4,018,848.

As also mentioned above, there may be those instances when the film forming material desirably comprises separate compounds, one or more bearing hydroxy functionality and one or more others bearing functionality which reacts in situ to form hydroxy functionality. Such film forming materials might, for example, consist of the above noted hydroxy functional copolymer combined with the epoxy functional copolymer discussed above or the polyepoxide resin discussed above. Various other combinations of materials, of course, will be apparent to those skilled in the art. Still other film forming materials are exemplified in the detailed examples set forth hereinafter.

Amino Crosslinking Agent

Amino crosslinking agents suitable for crosslinking hydroxy functional bearing materials are well known in the art and their selection will be obvious to those skilled in the art. Typically, the crosslinking materials are products of reactions of melamine or urea with formaldehyde and various alcohols containing up to and including 4 carbon atoms. Among the numerous materials which may be employed are the amine aldehyde resins such as condensation products of formaldehyde with melamine, substituted melamine, urea, benozguanamine or substituted benzoguanamine. Preferred members of this class are methylated melamine-formaldehyde resins such as hexamethyoxymethyl-melamine. These liquid crosslinking agents have substantially one hundred percent (100%) nonvolatile content as measured by the foil method at 45° C. for 45 minutes. Some particularly well known crosslinking agents are the amino resins sold by American Cyanamid under the trademark "Cymel." In particular, Cymel 301, Cymel 303, and Cymel 1156, which are alkylated melamine-formaldehyde resins are useful in compositions falling within the scope of this invention.

Of course, the amount of crosslinking agent employed in any given composition is a matter of choice depending upon the final properties desired and the nature of the other materials in the coating composition.

Other Materials

Of course, it should be recognized that coating compositions within the scope of this invention may include ther conventional components. These include, but are not limited to, antioxidants, U.V. absorbers, solvents, surface modifiers, wetting agents, pigments, fillers, etc.

The invention will be further understood by referring to the following detailed examples. It should be understood that the specific examples are presented by way of illustration and not by way of limitation. Unless otherwise specified, all references to "parts" are intended to mean parts by weight.

EXAMPLE 1

A hydroxy acrylic copolymer is prepared from the following monomers:

|  | Wt/Grams | Wt. % |
|---|---|---|
| Hydroxyethyl acrylate | 400 | 20 |
| Methylmethacrylate | 400 | 20 |
| Styrene | 200 | 10 |
| Butyl methacrylate | 1000 | 50 |

One hundred (100) grams tert-butyl perbenzoate is added to the above monomer mixture and the resulting solution added dropwise over a period of two hours to 1600 grams of refluxing (145°) methyl amyl ketone (under nitrogen). The heating and stirring is continued for half an hour after the addition is complete and then five (5) grams of tert-butyl perbenzoate are added portionwise to the reaction mixture. The reaction mixture is refluxed for an additional ninety minutes and then allowed to cool to room temperature. The molecular weight is determined by Gel Permeation Chromatography: $\overline{M}_n = 2540$, $\overline{M}_w/\overline{M}_n = 1.94$.
Calculated $T_g = 27°$ C.
Theoretical solids = 60%
Determined solids = 59.2%
Viscosity, #4 Ford Cup = 44 Sec.
Hydroxy equivalent weight = 980

Five hundred (500) grams of the above polymer solution are dissolved in 100 ml n-butyl acetate and the solution is heated to 60° C. Solid $P_2O_5$ is added portionwise with continuous stirring and maintaining the temperature at 60° C. Small test portions of the reaction mixture are titrated with sodium hydroxide solution and the addition of $P_2O_5$ is continued until the acid equivalent weight reaches 1564.

One hundred (100) parts of the above prepared hydroxy functional acrylic organophosphate reactive catalyst reactive product mixture are mixed with 18.21 parts of Cymel 301, 13 parts of aliphatic epoxy Araldite CY-178 and 15 parts of butyl acetate. The resulting formulation is applied by spraying in three coats to primed steel panels; the panels were baked at 130° C. for 20 minutes to obtain a glossy coating with excellent physical properties.

EXAMPLE 2

In a round-bottom four-necked flask, equipped with a stirrer, a dropping funnel, a thermometer and a condenser, 500 ml of methyl amyl ketone is brought to reflux under nitrogen. The following mixture of monomers is employed for polymer synthesis:

|  | Wt/Grams | Wt. % |
|---|---|---|
| Butyl methacrylate | 127.5 | 17 |
| Ethylhexyl acrylate | 180 | 24 |
| Glycidyl methacrylate | 195 | 26 |
| Methyl methacrylate | 210 | 28 |
| Styrene | 37.5 | 5 |

Thirty-seven (37) grams of tert-butyl perbenzoate is added to the above monomers and the resulting solution added dropwise to refluxing methyl amyl ketone over a period of one hour and ten minutes. The heating and stirring is continued for half an hour after the addition is complete and then two more grams t-butyl perbenzoate are added portionwise. The reaction mixture is refluxed for two more hours and then allowed to cool to room temperature. The molecular weight of the copolymer is determined by Gel Permeation Chromatography and found to be $\overline{M}_n = 3250$ and $\overline{M}w/\overline{M}_n = 2.2$. The calculated Tg of the polymer is 9° C. and the solution viscosity (#4 Ford cup) is 41 seconds.

Fifty parts of the above polymer solution are mixed with 94 parts the reactive catalyst reaction product mixture from Example 1, 28.5 parts of Cymel 301 and 40 parts of n-butyl acetate. The resulting formulation is applied by spraying to primed steel panels and is baked at 130° C. for 20 minutes to obtain glossy coating with excellent hardness and adhesion.

EXAMPLE 3

An acrylic copolymer is prepared from the following monomers:

|  | Parts by Weight |
| --- | --- |
| Butyl methacrylate | 26 |
| Ethylhexyl acrylate | 20 |
| Hydroxyethyl acrylate | 30 |
| Styrene | 24 |

The preparation is carried out in the same way as outlined in Example 1 by using cellusolve acetate as the solvent and tert-butyl peroctoate (5% of monomers) as initiator to obtain a 70% solution of the polymer. The calculated Tg is $-7°$ C. and the molecular weight from Gel Permeation Chromatography is $\overline{M}_n = 3070$ and $\overline{M}_w/\overline{M}_n = 2.2$.

Four hundred (400) grams of this polymer solution are mixed with 100 grams of cellusolve acetate and the solution is heated to 50° C. Thirty-five (35) grams of phosphorus pentoxide are added portionwise (5 hours) with continuous stirring and maintaining the temperature at 60° C. After the addition is complete, the reaction mixture is heated for one hour at 60° C. and then it is filtered through a coarse filtering paper. From sodium hydroxide titration, the acid equivalent weight is found to be 786. Gel Permeation Chromatography shows its molecular weight (Mn) to be 3102 (d=2.5).

Fifty (50) parts of the above reactive catalyst reaction product mixture are mixed with 48 parts of the hydroxy polymer solution from Example 1, 14.5 parts Cymel 301, 15 parts butyl acetate and the resulting formulation is spray applied to primed steel panels. The panels are baked at 130° C. for 25 minutes to obtain a hard, glossy coating with excellent adhesion and impact strength.

EXAMPLE 4

Five parts of Acryloid OL-42, three parts of Cymel 301 and three parts of butyl acetate are added to the formulation described in Example 2. The resulting formulation is applied by spraying to primed steel panels in three coats and is baked at 130° C. for 20 minutes to obtain coatings with excellent physical properties.

EXAMPLE 5

Seven parts of bis-(hydropropyl)-azelate and four parts of Cymel 301 are added to the composition described in Example 3 and the resulting formulation is spray applied to primed steel panels. The panels are baked at 130° C. for 20 minutes to obtain hard, glossy coating with excellent adhesion and solvent resistance.

EXAMPLE 6

By following the procedure described in Example 2, a copolymer is prepared from the following monomers:

|  | Wt. % |
| --- | --- |
| Butyl methacrylate | 49 |
| Glycidyl methacrylate | 20 |
| Hydroxypropyl methacrylate | 10 |
| Methyl methacrylate | 16 |
| Styrene | 5 |

The calculated Tg of the copolymer is 43° C. and solids content is found to be 52%. The molecular weight, by Gel Permeation Chromatography, is found to be, $\overline{M}_n = 2904$ and $\overline{M}_w/\overline{M}_n = 2.31$.

Fifteen (15) parts of the above polymer solution are mixed with 2.2 parts Cymel 301, 8.6 parts of the reactive catalyst reaction product mixture from Example 3 and 5.2 parts of methyl amyl ketone. The resulting formulation is drawn on a steel panel with Bondrite treatment and is baked at 130° C. for 20 minutes to obtain glossy coating with excellent hardness and adhesion.

EXAMPLE 7

Reactive catalyst reaction product mixture, 7.9 parts, from Example 3 is mixed with 2.8 parts Cymel 301, 2.1 parts Araldite CY 178 and 4 parts of butyl acetate. The resulting formulation is drawn on a primed steel panel and is baked at 130° C. for 20 minutes to obtain a hard, glossy (95/20°) film with excellent solvent resistance (xylene and methyl ethyl ketone) and adhesion.

EXAMPLE 8

Fifteen parts of glycidyl methacrylate polymer from Example 6, six parts Cymel 301 and 8.6 parts of reactive catalyst reaction product mixture from Example 3 are dissolved in 7.5 parts of methyl amyl ketone. The resulting formulation is drawn on a primed steel panel and is baked at 130 C. for 25 minutes to obtain a coating with excellent hardness, adhesion and solvent resistance.

EXAMPLE 9

Two parts of bis-(hydroxypropyl) azelate is added to the formulation described in Example 8 and the panels are baked in the same manner to obtain coatings with excellent gloss, hardness, adhesion and solvent (xylene and methyl ethyl ketone) resistance.

EXAMPLE 10

Seventy-five parts of the glycidyl polymer described in Example 6, 30 parts of Cymel 301 and 43 parts of reactive catalyst mixture from Example 6 are dissolved in 10 parts of methyl amyl ketone. The formulation is applied by spraying to primed steel panels in three coats. The panels are baked at 110° C. for 20 minutes to obtain coatings with excellent physical properties.

EXAMPLE 11

In the formulation described in Example 7, three parts of benzoguanamine resin Cymel 1123 is substituted for Cymel 301. The resulting formulation is drawn on primed steel panels and is baked at 120° C. for 20 minutes to obtain coatings with excellent hardness, adhesion and solvent (xylene and methyl ethyl ketone) resistance.

EXAMPLE 12

Ten parts of glycoluril resin Cymel 1170 are substituted for Cymel 301 in Example 8 and two parts of 2-ethyl-1,3-hexanediol are added to the resulting formulation. The solution is drawn on primed steel panels and is baked at 130° C. for 20 minutes to obtain coatings with excellent hardness, adhesion and solvent (xylene and methyl ethyl ketone) resistance.

EXAMPLE 13

Thirty-five parts of urea resin Beetle 80 are substituted for Cymel 301 in Example 2 and 4 parts of 1,4-benzenedimethanol are added to it. The resulting formulation is applied by spraying to primed steel panels and is baked at 130° C. for 20 minutes to obtain coating with excellent hardness, adhesion and gloss.

EXAMPLE 14

A copolymer is prepared from the following monomers by following the procedure described in Example 1(a).

|  | Wt. % |
|---|---|
| Butyl methacrylate | 50 |
| Ethylhexyl acrylate | 10 |
| Glycidyl methacrylate | 15 |
| Hydroxypropyl methacrylate | 10 |
| Methyl methacrylate | 10 |
| Styrene | 5 |

Toluene is used as solvent to obtain a 60% solution of the polymer; tert-butyl peroctoate (3.7% of monomers) is used as an initiator. Toluene (60%) is distilled off and butyl acetate is added to bring the solids level to 60% by weight. The calculated Tg of the polymer is 25° C. and the molecular weight by Gel Permeation Chromatography is found to be $\overline{M}n=5301$, $\overline{M}w/\overline{M}n=2.9$.

Three hundred (300) parts of this polymer solution are mixed well with 10.69 parts of aluminum flakes (65% in naphtha), 3.40 parts of zinc naphthanate, and 92 parts of hexamethoxymethyl melamine (Cymel 301) are added to this mixture. 152 parts of the reactive catalyst mixture from Example 3 and 40 parts of bis-(hydroxypropyl) azelate are dissolved in 50 ml of cellusolve acetate; this solution is added to the above mixture and the resulting formulation applied by spraying to primed steel panels in three coats. The panels are baked at 130° C. for 20 minutes to obtain silver metallic coatings with excellent physical properties.

EXAMPLE 15

A millbase is prepared by dispersing titanium dioxide in the polymer solution described in Example 14 with a high speed Cowl's blade. The composition of the millbase is: 15% polymer (100% nonvolatile), 65% titanium dioxide and 20% methyl amyl ketone. Seventy-two (72) parts of this millbase, 31 parts of the polymer solution from Example 14, 12.5 parts of bis-(hydroxypropyl) azelate, 34 parts of Cymel 301 and 29 parts of methyl amyl ketone are taken up in a plastic bottle. Twenty-five (25) parts of reactive catalyst mixture from Example 3 are added to the above mixture and the resulting formulation spray applied to both primed and unprimed steel panels. The panels are baked at 120° C. for 20 minutes to obtain hard, glossy coatings with excellent adhesion. The coating has an excellent solvent and humidity resistance.

EXAMPLE 16

Three hundred fifty (350) parts of TiO₂ are mixed with 350 parts of Acryloid OL-42 (Rohm & Haas Chem. Co.) and 25 parts of n-butyl acetate. The above mixture is taken up in a porcelain bottle containing porcelain beads and put on a roller mill for 16 hours. Thirty-one (31) parts of this mill base are mixed with 10 parts of hydroxy ester Desmophen KL5-2330 (Rohm & Haas Chem. Co.), 5 parts of 1,4-butanediol diglycidyl ether and 16 parts of Cymel 301. In a separate flask 5 parts of Desmophen KL5-2330 are mixed with 40 parts of reactive catalyst mixture from Example 3. The above two solutions are mixed together and the resulting formulation sprayed on primed panels in a four coat application (thickness 3.23.9 mil) with an intermediate flash of 1.25 minutes. After 5 minutes final flash the panels are baked at 125° C. for 20 minutes to obtain a glossy (95°/20°) coating with excellent xylene and methyl ethyl ketone resistance. The solids by weight are determined (130° C./30 min) to be 71%.

EXAMPLE 17

Five hundred (500) parts of TiO₂ and 250 parts of Ferrite yellow are mixed with 500 parts of Acryloid OL-42, 7.8 parts of dispersing agent BYK P 104S (Mellinckrodt) and 200 parts of n-butyl acetate; the mill base is prepared as described in Example 16.

Fifty parts of the above mill base are mixed with 25 parts Acryloid OL-42, 3 parts of bis-(hydroxypropyl)-azelate, 20 parts of Cymel 301 and 10 parts of butyl acetate. Five parts of reactive catalyst mixture from Example 1 are added to the above mixture and the resulting formulation is applied by spraying to primed steel panels. The panels were baked at 130° C. for 20 minutes to obtain coatings with excellent hardness, adhesion and gloss.

In view of this disclosure, many modifications of this invention will be apparent to those skilled in the art. It is intended that all such modifications which fall within the true scope of this invention be included within the terms of the appended claims.

I claim:

1. In a thermosetting coating composition comprising a film forming component and an amine aldehyde crosslinking agent, which composition cures by reaction between said amine aldehyde crosslinking agent and hydroxy functionality present on said film forming material, the improvement comprising including in said composition a hydroxy functional acrylic organophosphate reactive catalyst consisting essentially of the reaction product of:
   (1) a hydroxy functional acrylic copolymer which (a) has a number average molecular weight ($\overline{M}n$) of between about 1500 and about 6000 and a glass transition temperature of between about −25° C. and about 70° C., and (b) bears between about 2 and about 10 pendent hydroxy groups per molecule; and
   (2) sufficient phosphorus pentoxide to produce a reaction product having an acid equivalent weight of between about 500 and about 3000.

2. A composition in accordance with claim 1 wherein said film forming material consists essentially of a compound bearing hydroxy functionality.

3. A composition in accordance with claim 2 wherein said film forming material has a number average molecular weight of at least 150.

4. A composition in accordance with claim 2 wherein said film forming material consists essentially of a copolymer bearing pendent hydroxy functionality, having a number average molecular weight ($\overline{M}_n$) of between about 1000 and about 20,000 and a glass transition temperature (Tg) of between about −25° C. and about 70° C., said copolymer consisting of between about 5 and about 30 weight percent of monoethylenically unsaturated monomers.

5. A coating composition in accordance with claim 1 wherein said film forming material consists essentially of a compound which reacts in situ during cure of said composition to form hydroxy functionality.

6. A coating composition in accordance with claim 5 wherein said reaction in situ forms substantially all of the crosslinking functioinality in said film forming material.

7. A coating composition in accordance with claim 5 wherein said film forming material includes hydroxy functionality in addition to that which is formed by said reaction in situ.

8. A coating composition in accordance with claim 5 wherein said compound bears epoxy functionality which reacts with said hydroxy functional acrylic organophosphate reactive catalyst during cure of said composition to form hydroxy f functionality which, in turn, reacts with said amino compound.

9. A coating composition in accordance with claim 1 wherein said film forming material consists essentially of a compound bearing both epoxy and hydroxy functionality.

10. A coating composition in accordance with claim 1 wherein said film forming material consists essentially of a mixture of a compound bearing hydroxy functionality and a compound bearing epoxy functionality.

* * * * *